US012639524B1

(12) United States Patent
Jabara et al.

(10) Patent No.: US 12,639,524 B1
(45) Date of Patent: May 26, 2026

(54) END-TO-END SOFTWARE SOLUTION TO IMPROVE ELECTRONIC DOCUMENTS

(71) Applicant: U Startups LLC, Gaithersburg, MD (US)

(72) Inventors: John Jabara, Gaithersburg, MD (US); Marc Steren, Gaithersburg, MD (US)

(73) Assignee: U Startups LLC, Gaithersburg, MD (US)

( * ) Notice: Subject to any disclaimer, the term of this patent is extended or adjusted under 35 U.S.C. 154(b) by 454 days.

(21) Appl. No.: 17/901,756

(22) Filed: Sep. 1, 2022

Related U.S. Application Data

(60) Provisional application No. 63/239,848, filed on Sep. 1, 2021.

(51) Int. Cl.
    *G06F 40/40*        (2020.01)
    *G06F 40/103*     (2020.01)
    *G06F 40/284*     (2020.01)
(52) U.S. Cl.
    CPC ............ *G06F 40/40* (2020.01); *G06F 40/103* (2020.01); *G06F 40/284* (2020.01)
(58) Field of Classification Search
    CPC ................................ G06N 20/00; G06N 20/20
    See application file for complete search history.

(56) References Cited

U.S. PATENT DOCUMENTS

| | | | | |
|---|---|---|---|---|
| 7,523,085 B2 * | 4/2009 | Nigam | ................. | G06F 40/253 |
| | | | | 706/55 |
| 7,831,196 B2 * | 11/2010 | Attali | ...................... | G09B 7/00 |
| | | | | 434/353 |
| 9,116,979 B2 * | 8/2015 | Lee | ....................... | G06F 16/435 |
| 10,353,720 B1 * | 7/2019 | Wich-Vila | .......... | G06F 3/04842 |
| 11,714,967 B1 * | 8/2023 | Wu | ................... | G06Q 50/2053 |
| | | | | 704/9 |
| 2009/0055389 A1 * | 2/2009 | Schilit | ................ | G06F 16/3344 |
| | | | | 707/999.005 |
| 2018/0260469 A1 * | 9/2018 | Paris | ..................... | H04L 9/0877 |
| 2019/0304320 A1 * | 10/2019 | Apokatanidis | .......... | G09B 7/02 |
| 2020/0293605 A1 * | 9/2020 | Nelson | ................... | G06N 20/00 |
| 2022/0058338 A1 * | 2/2022 | Hanson | ................. | G06N 20/00 |
| 2022/0188514 A1 * | 6/2022 | Thota | ...................... | G09B 5/02 |
| 2022/0366344 A1 * | 11/2022 | Shi | .................. | G06Q 10/06393 |

* cited by examiner

*Primary Examiner* — Daniel C Washburn
*Assistant Examiner* — Tyler Becker
(74) *Attorney, Agent, or Firm* — Foley & Lardner LLP

(57) ABSTRACT

A computer-implemented method comprising receiving, by a computer, at least one input corresponding to at least one of an attribute of a user or an interest of the user; executing, by the computer, a machine-learning model to generate at least one topic associated with an essay based on the at least one input; in response to outputting, by the computer, the at least one topic, receiving, by the computer, an electronic document; executing, by the computer, the machine-learning model to identify a score associated with the electronic document using the at least one topic; and displaying, by the computer, the score.

16 Claims, 3 Drawing Sheets

200

100

120

120a

120b

120c

150

Network 130

110a   110b

Model
160

Model
140

200

Receiving at least one input corresponding to at least one of an attribute of a user or an interest of the user. 202

↓

Executing a machine-learning model to generate at least one topic associated with an essay based on the at least one input. 204

↓

Outputting the at least one topic. 206

↓

Receiving an electronic document. 208

↓

Executing the machine-learning model to identify a score associated with the electronic document using the at least one topic. 210

↓

Displaying the identified score. 212

FIG. 2

| Criteria to be Assessed | 4 | 3 | 2 | 1 |
|---|---|---|---|---|
| 1. Ideas | Writing successfully presents the topic in a novel or unique way. Writing includes excellent and specific concrete detail and insightful commentary. | Writing presents the topic in an interesting way. Writing includes good concrete detail and some insightful commentary. | Writing presents the topic in an ordinary way. Writing includes concrete detail, but commentary is obvious, simplistic, or generic. | Writing presents the topic in an ordinary way. Concrete details and commentary are either weak or missing. |
| 2. Organization | Writing has a compelling and logical flow of ideas. | Writing has a logical flow of ideas. | Organization is rough but workable. It sometimes gets off-topic. | Writing is aimless and disorganized. |
| 3. Introduction | Writing engages reader with a small moment or in a unique way that reflects an important aspect of the narrative and entices them to continue reading. | Writing engages and entices the reader but content does not reflect an important aspect of the narrative. | Writing is simple and direct without the use of any show-not-tell or language that entices the reader to continue reading. | The introduction does not demonstrate the narrative's focus in any way and causes confusion for the reader. |
| 4. Topic Sentences and Transitions | Paragraphs have focused and poignant topic sentences and smooth, almost seamless transitions. | Paragraphs have focused topic sentences and obvious transitions. | Paragraphs have topic sentences that need to be more focused and rough transitions. | Paragraphs lack topic sentences and transitions. |
| 5. Description | Writing consistently and effectively shows rather than tells through specific and vivid details. | Writing shows rather than tells, but details could be more specific and vivid. | Writing includes some showing but needs more. | Writing uses all telling and no showing. |
| 6. Voice | Writing reveals your unique personality and view of the world, leaving the reader to want to know more about who you are. | Writing reveals some of your thoughts and feelings but needs more personality behind it. | Writing is bland. There is either no hint of a real person behind the writing. | Writing is too informal. It sounds like you don't care about the topic of the essay. |
| 7. Word Choice | Writing uses words that are striking and fresh but natural, varied, and vivid. | Writing makes some quality but also some routine or ordinary word choices. | Writing uses words that are dull or uninspired. Writing sounds like you are trying too hard to impress. | Writing uses the same words over and over. Some words may be confusing or inappropriate. |
| 8. Grammar Usage and Sentence Fluency | Writing uses proper grammar 100% of the time. Sentences flow well and vary in construction and length. | Writing has a few grammar problems. Sentences flow well but do not vary much. | Writing has enough grammar errors to distract a reader. Some sentences do not flow well and/or are not varied at all. | Writing has numerous grammar mistakes and poor sentence construction that make the paper hard to read. |
| 9. Spelling and Punctuation | Writing uses correct punctuation and spelling 100% of the time. | Writing has a few errors to fix but generally uses correct conventions. | Writing has enough errors in the essay to distract a reader. | Writing has numerous errors that make the paper hard to read. |

FIG. 3

END-TO-END SOFTWARE SOLUTION TO IMPROVE ELECTRONIC DOCUMENTS

CROSS-REFERENCE TO RELATED APPLICATIONS

This application claims priority to U.S. Provisional Application No. 63/239,848, filed Sep. 1, 2021, which is incorporated by reference in its entirety for all purposes.

TECHNICAL FIELD

This application relates generally to generating, training, calibrating, and executing artificial intelligence and machine-learning models.

BACKGROUND

Conventional proofreading software solutions help users identify grammatical and typographical errors. These conventional solutions may also analyze a corpus of text (e.g., essays) to identify readability metrics, such as percentage of passive sentences, Flesch reading ease metrics, and/or Flesch-Kinkaid grade level indicators. While conventional software solutions provide helpful retroactive guidance, they do not provide an end-to-end proactive solution that helps users write better essays that are suitable for a specific purpose (e.g., college admission essays). Therefore, conventional methods (e.g., software solutions and online tools) suffer from technical shortcomings.

SUMMARY

For the aforementioned reasons, there is a need for a more efficient and accurate system and method for eliminating inefficiencies and other technical shortcomings created by conventional software solutions and online tools. There is a need for a network and computer-specific set of rules to guide users through preparing electronic documents that suits their purpose.

The methods and systems described herein allow a server to receive and analyze essays (also known as papers or documents) using various analytical methods including utilizing machine learning (ML) models to execute natural language processing (NLP) protocols. The ML model may be trained to analyze various attributes of an essay, such as grammatical, syntactical, and sentiment attributes of the essay (and stylo-metric attributes). The ML model may also provide helpful tips and pointers to allow users to draft better essays. The end-to-end software product described herein may include an interactive graphical user interface (GUI) that can display helpful tips while highlighting the portions of the essay that can be improved. Therefore, unlike conventional solutions, the methods and systems discussed herein allow for an interactive way for a user to utilize ML models to improve their writing.

In one embodiment, a computer-implemented method comprises receiving, by a computer, at least one input corresponding to at least one of an attribute of a user or an interest of the user; executing, by the computer, a machine-learning model to generate at least one topic associated with an essay based on the at least one input; in response to outputting, by the computer, the at least one topic, receiving, by the computer, an electronic document; executing, by the computer, the machine-learning model to identify a score associated with the electronic document using the at least one topic; and displaying, by the computer, the score.

In another embodiment, a system comprises a machine-learning model; a processor in communication with the machine-learning model, the processor configured to: receive at least one input corresponding to at least one of an attribute of a user or an interest of the user; execute the machine-learning model to generate at least one topic associated with an essay based on the at least one input; in response to output the at least one topic, receiving, by the computer, an electronic document; execute the machine-learning model to identify a score associated with the electronic document using the at least one topic; and display the score.

In another embodiment, a system comprises a machine-readable computer medium having a set of instructions that when executed cause a processor to: receive at least one input corresponding to at least one of an attribute of a user or an interest of the user; execute a machine-learning model to generate at least one topic associated with an essay based on the at least one input; in response to output the at least one topic, receiving, by the computer, an electronic document; execute the machine-learning model to identify a score associated with the electronic document using the at least one topic, and display the score.

BRIEF DESCRIPTION OF THE DRAWINGS

Objects, aspects, features, and advantages of embodiments disclosed herein will become more fully apparent from the following detailed description, the appended claims, and the accompanying drawing figures in which reference numerals identify similar or identical elements. Reference numerals that are introduced in the specification in association with a drawing figure may be repeated in one or more subsequent figures without additional description in the specification to provide context for other features, and not every element may be labeled in every figure. The drawing figures are not necessarily to scale, emphasis instead being placed upon illustrating embodiments, principles, and concepts. The drawings are not intended to limit the scope of the claims included herewith.

FIG. 2 illustrates a workflow executed by an AI-backed essay analyzer system, in accordance with an embodiment.

FIG. 3 illustrates a scoring scheme executed in an AI-backed essay analyzer system, in accordance with an embodiment.

Figure 1:
FIG. 1 is a computing environment for an artificial intelligence (AI) backed essay analyzer system, in accordance with an embodiment.

The features and advantages of the present solution will become more apparent from the detailed description set forth below when taken in conjunction with the drawings, in which reference characters identify corresponding elements throughout. In the drawings, reference numbers generally indicate identical, functionally similar, and/or structurally similar elements.

Reference will now be made to the illustrative embodiments and specific language will be used here to describe the same. It will nevertheless be understood that no limitation of the scope of the invention is thereby intended. Alterations and further modifications of the inventive features described here, and additional applications of the principles of the inventions as described here, which would occur to a person skilled in the relevant art and having possession of this disclosure, are to be considered within the scope of the invention.

DETAILED DESCRIPTION

Reference will now be made to the illustrative embodiments depicted in the drawings, and specific language will be used to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting to the subject matter presented.

As will be described throughout, a server of an AI-backed essay analyzer system 100, such as an analytics server 110a can retrieve and analyze data using various methods described herein. FIG. 1 is a non-limiting example of components of the AI-backed essay analyzer system 100 in which the analytics server 110a operates. Other configurations having more or fewer features can be used by the analytics server 110a.

The analytics server 110a may utilize features described in FIG. 1 to retrieve data, train various ML models, and present the data. The analytics server 110a may be communicatively coupled to a system database 110b, electronic data sources 120a-c (collectively electronic data sources 120), ML model 140, and a user device 150. The system 100 is not confined to the components described herein and may include additional or alternative components, not shown for brevity, which are to be considered within the scope of the embodiments described herein.

The above-mentioned components may be connected through a network 130. The examples of the network 130 may include but are not limited to, private or public LAN, WLAN, MAN, WAN, and the Internet. The network 130 may include both wired and wireless communications according to one or more standards and/or via one or more transport mediums.

The analytics server 110a may utilize one or more application programming interfaces (APIs) to communicate with one or more of the electronic devices described herein. For instance, the analytics server may utilize APIs to automatically receive data from the electronic data sources 120. The analytics server 110a may receive data as it is generated, monitored, collected, and/or processed by the electronic data sources 120. For instance, the analytics server 110a may utilize an API to receive data from the database 120b without any human intervention. This automatic communication allows for faster retrieval and processing of data. Using the APIs, the analytics server 110a can periodically monitor data. For instance, the APIs may notify the analytics server 110a that a data record has been revised or a new data record has been identified.

The analytics server 110a may generate and/or host an electronic platform having a series of graphical user interfaces (GUIs) configured to receive and display results to a user, such as a user operating the user device 150. An example of the platform generated and/or hosted by the analytics server 110a may be a web-based application or a website configured to be displayed on different electronic devices, such as mobile devices, tablets, personal computers, and the like. For instance, the analytics server 110a may host a website accessible to users, where the content presented via the various web pages may be controlled based on each particular user's role or viewing permissions. In some example, a separate server may host the platform and communicate with the analytics server.

The analytics server 110a may be any computing device comprising a processor and non-transitory machine-readable storage capable of executing the various tasks and processes described herein. Non-limiting examples of such computing devices may include servers, computers, workstation computers, personal computers, and the like. While this example of the system 100 includes a single analytics server 110a, in some configurations, the analytics server 110a may include any number of computing devices operating in a distributed computing environment.

The analytics server 110a may also store various internal rules and thresholds within the system database 110b. The analytics server 110a may use the rules and thresholds to train and/or execute the ML model 140 and/or analyze the results of the execution of the ML model 140. For instance, the analytics server 110a may store various attributes and variables related to training methods used to train the ML model 140 within the system database 110b. An example of a rule may include rules that identify one or more topics based on a user's attributes. For instance, a rule may indicate that a user may benefit from discussing the fact that he is bilingual.

The ML model 140 may be any collection of one or more algorithms and machine-readable code that can ingest data to analyze various electronic documents and/or attributes of a user. Additionally or alternatively, the ML model 140 may represent an AI/ML model (e.g., neural network) that can be trained in accordance with data received from the electronic data sources 120. Specifically, the analytics server 110 may use the data collected from the electronic data sources 120 to generate a training dataset and train the ML model 140 using various ML techniques (e.g., supervised, unsupervised, or semi-supervised). The ML model 140 may be configured to ingest data associated with a user and recommend various attributes associated with an electronic document to be created (e.g., essay). The ML models may also ingest the electronic document and analyze the essay itself and provide feedback.

The electronic data sources 120 may represent different databases or third-party vendors who possess data needed to train and execute the ML model 140. For instance, the electronic data source 120b may be a database that is configured to store (and sometimes periodically update) previous essays drafted by students, such as historical college admission essays. In some embodiments, the data needed to train the ML model 140 may be received from a third party (e.g., a college admission database). For instance, the electronic data source 120c may be a server associated with a third-party website that is configured to monitor and collect data associated with various essays or college admission criteria.

In another example, the electronic data source 120a may be any computing device comprising a processor and a non-transitory machine-readable storage medium capable of inputting data points, such that they are transmitted to the analytics server 110a. For instance, the data received via the data source 120a may be used to train the ML model 140. For instance, the data needed to train the ML model 140 may be inputted via an employee/administrator. Non-limiting examples of the data source 120a may include workstation computers, laptop computers, tablet computers, and server computers.

The user device 150 may represent a computing device operated by a user. As used herein, a user may be the user may be a student (or another user on behalf of the student)

attempting to prepare an essay, such as a college admission essay. Therefore, user and student have been used synonymously.

The user device 150 may be configured to display retrieved data, in the form of results generated by the analytics server 110a (e.g., via executing the computer model 140) where the user can enter data and view the results. For instance, a user may access the platform and enter their information (e.g., demographic data, interests, course experience, academic achievements and strength, and extracurricular activities). In turn, the analytics server 110a may execute the ML model 140 and display a list of suitable topics. Additionally or alternatively, the analytics server 110a may identify the list of topics using the rules discussed herein.

The user may then draft an essay and upload an electronic document using the platform discussed herein. As a result, the analytics server 110a may then analyze the electronic document and may display the results on the user device 150. Non-limiting examples of the user device 150 may include workstation computers, laptop computers, tablet computers, and server computers.

The ML model 140 may be trained using a training dataset that may be procured/generated via data retrieved from the electronic data sources 120 and/or any other data received from other data sources. The system 100 may also include additional ML models, such as the ML model 160. The ML model 160 may be configured to analyze a user's data to identify topics associated with the user. For instance, college essay topics may be related to a job or major desired by the user. The topic classification (prediction) may be homomorphic to a college major or job/field classifier. As a result, the ML model 160 may ingest the user's attributes and identify an essay topic for the user. The ML model 160 may be trained via methods and systems discussed in U.S. patent application Ser. No. 17/891,674, filed Aug. 19, 2022, which is incorporated by reference in its entirety.

In a non-limiting example, the ML model 160 may determine that a user is well-suited for an engineering major. As a result, the ML model 160 may recommend topics that are associated with engineering/science (e.g., topics that highlight the user's scientific background). Even though FIG. 1 depicts two separate ML models 140 and 160, in some embodiments, these ML models can be combined into a single ML model.

Referring now to FIG. 2, a workflow diagram for the AI-backed essay analyzer system is depicted, in accordance with one or more implementations. A method 200 includes steps 202-212. However, other embodiments may include additional or alternative execution steps or may omit one or more steps altogether. The method 200 describes how a server (e.g., analytics server) can predict topics for a student and analyze their essay using ML modeling techniques. The method 200 is described as being executed by an analytics server, similar to the analytics server described in FIG. 1. Different steps of the method 200 or different parts of the different steps may be executed by any number of computing devices operating in the distributed computing system described in FIG. 1.

At step 202, the analytics server may receive at least one input corresponding to at least one of an attribute of a user or an interest of the user. The analytics server may receive attributes associated with a user, such as the user's interests (e.g., college and/or major interests) and/or other attributes (e.g., demographic, skills, academic strength, and the like). The analytics server may generate and host (e.g., display) an electronic platform configured to receive various inputs, such as user attributes. An example of the electronic platform generated and hosted by the server may be a web-based application or a website configured to be displayed on different electronic devices, such as mobile phones, tablet computers, personal computers, and the like.

In a non-limiting example, a user may access the platform and use various input elements to input one or more attributes and characteristics that best describe the user. The platform may include a questionnaire and corresponding input elements (e.g., text boxes in order to allow users to input their responses, radio buttons, and/or drop-down menus). The questionnaire may prompt the user to input student attributes, such as academic strength, extracurricular activity, or course experience. The questionnaire may prompt the user to input responses corresponding to their personal information, such as demographic information, age, sex, race, household questions, and the like. The questionnaire may also prompt the user to input responses regarding their educational background, such as courses taken, grades achieved, course information (e.g. lesson plans, what the student learned, and user skills), interests, projects, desired school, a desired program to attend, and the like.

Moreover, the questionnaire may prompt the user to input their goals and/or interests (e.g., the end goal for the user, such as "getting into college" or "pursuing a computer science major").

The questionnaire may also inquire the user to input their interests (e.g., favorite field, favorite job, interest in the field of study, income level, and the like). Additionally, the questionnaire may inquire the user to input their personal background information (e.g., ethnicity, whether the user is bilingual, and interesting facts about themselves).

In some configurations, the server may use one or more identifiers of the user/student to retrieve raw data associated with the user/student. For instance, the server may web-crawl or otherwise communicate with multiple databases to retrieve data associated with the user. In some embodiments, the analytics server may analyze the data retrieved to extract user attributes. For instance, the analytics server may retrieve the user's transcripts to extract and identify the user's grades or a complete list of courses taken. The analytics server may augment the data inputted by the user using the retrieved data.

At step 204, the analytics server may execute a machine-learning model to generate at least one topic associated with an essay based on the at least one user attribute inputted by the user.

The analytics server may use a variety of methods (algorithmic and/or ML models) to analyze the data received (or retrieved) in the step 202. The analytics server may then identify ideal topics and sentiments that are unique to the user and might result in a better (more interested and more likely to help with college admission) essay. The analytics server may retrieve one or more sets of rule-based algorithms to identify the one or more topics. For instance, a rule may indicate that if a user is bilingual, the user should discuss their diverse background. The analytics server may execute multiple algorithms and generate a list of topics to be included in the essay.

In another example, the server may utilize a ML model to identify the topics. The server may train the ML model using previously submitted essays and attributes of the users who drafted the essays. Using various ML training methods the analytics server may train the ML model, such that the ML model is able to ingest a set of user attributes and identify an ideal set of topics. A non-limiting example of this ML model may be the ML model 160 depicted in FIG. 1.

Before executing the ML model, the analytics server may generate a set of tokens that are unique to the user. The set of tokens may be customized for the user in accordance with the user's attributes (e.g., skills, background, and goals). The analytics server may utilize a classifier object to generate the tokens. After initialization, the classification instance may be prepared to take user inputs/attributes. When the analytics server receives user data (e.g., the user inputs their interests as discussed in step 202), the analytics server may tokenize the user data in order to execute the ML model.

The analytics server may execute the ML model that receives the tokenized data and outputs a list of topics. Upon the analytics server executing the ML model, the analytics server may receive (from the ML model) a multi-dimensional vector containing probabilities for each topic within a set of topics to be applicable to the user. The probabilities may indicate a likelihood of suitability of each topic for the user and may indicate a likelihood of the user's essay being more successful when analyzed by college admission staff. The probabilities may be uniquely calculated for the user (and the user's goals, such as being admitted into the desired college) because the ML model ingests data that has been tokenized based on the user's inputs. Accordingly, the ML model may apply its training to the user-specific data to calculate the probabilities and to identify at least one topic.

At step 206, the analytics server may output the at least one topic. After identifying the essay topics using algorithmic and/or ML protocols, the analytics server may update the GUI discussed herein to include the one or more essay topics. In some embodiments, the analytics server may update the GUI (within the platform) to present at least a portion of the topics (e.g., ranked or filtered based on different criteria). For instance, the user may indicate an affinity toward certain topics. As a result, those topics may be shown as high-ranked topics.

Additionally or alternatively, the analytics server may display an outline of topics (or other collection of subject matters) to be included in the essay on the GUI. The outline may also include an order to discuss the identified topics within the essay. For instance, the GUI may present three subject matters to be included in the essay and may include an order associated with each topic.

At step 208 the analytics server may receive an electronic document. After displaying the topics (step 206), the analytics server may display an input element (e.g., text box) on the GUI/platform allowing the user to input or upload their essays. After reviewing the topics, the user may draft an essay accordingly. The user may then use the input element to input the essay, such that the server can further analyze the essay.

At step 210, the analytics server may execute the machine-learning model to identify a score associated with the electronic document using the predicted topic. The analytics server may utilize various ML-enabled protocols (and other algorithmic-based methods) to perform NLP and to identify potential opportunities for improvement, such as cliché analysis, context analysis, grammatical issues, and the like. The analytics server may identify potentially problematic areas within the essay and may output a score and/or recommendations for the user. The score may indicate a likelihood of the essay complying with the outline of topics recommended by the analytics server. Additionally or alternatively, the score may indicate a likelihood of success for the essay. For instance, a high score may indicate that college admission staff will probably positively receive the essay. In contrast, a low score may indicate that the essay may not improve the user's chances of being admitted.

The analytics server may first train the ML model to perform various NLP protocols (e.g., to identify grammatical issues, such as sentence structure, and syntactical issues). The analytics server may also train the ML model to identify clichés. The analytics server may train the ML model using a supervised, unsupervised, or semi-supervised method. The analytics server may generate a training dataset that includes previous essays (e.g., the text of the essays). The analytics server may augment the training dataset by retrieving data associated with previously submitted essays, such as data associated with the drafter (e.g., the type of data collected in the first step) and data associated with the reviewer (e.g., the school to which the essay was submitted). The training dataset may also be augmented via data associated with the quality of the essays included within the training dataset.

Using the training dataset, the analytics server may train the ML model, such that the ML model can analyze a new dataset (e.g., essay) and identify opportunities to improve (e.g., possible clichés). The analytics server may train the ML model using a supervised method where the clichés are fully labeled. For instance, the analytics server may generate and display a platform where a reviewer can review the essay and label the essay as cliché. In some configurations, the reviewer may assign a numerical grade indicating a cliché level associated with the essay. In another example, the analytics server may collect data associated with how the essays were previously rated. For instance, if an essay was submitted for admission purposes, the analytics server may collect data associated with how the essay was received by the admission staff (e.g., whether the student was accepted). The analytics server may then label the training dataset accordingly.

Additionally or alternatively, the server may use an unsupervised method where the training dataset is not labeled. Labeling the data within the training dataset may be time-consuming and may require vast computing power. Additionally, labeling the data may be challenging because quantifying clichés and theme detection may be dependent upon the reviewer's subjective skills and understanding. As a result, the server may utilize unsupervised training techniques to train the ML model where essays and results (e.g., whether the essay was submitted or resulted in acceptance/rejection) can be ingested by the ML model.

Using various ML training techniques, the ML model may identify hidden patterns within the data, such that the ML model can identify a score, clichés, and/or unwanted themes given a new essay. The analytics server may continuously or periodically train the ML model until a predetermined level of accuracy is reached. In some configurations, the analytics server may train the ML model using a predetermined portion (e.g., fold) of the training dataset. The analytics server may then gauge the ML model's accuracy (e.g., area under the curve, precision, and recall) using the remaining data points within the training dataset (e.g., second fold). For instance, the analytics server may train the ML model using 75% of the training dataset. The analytics server may then use the remaining 25% of data to gauge the accuracy of the trained ML model. The analytics server may continuously and iteratively train the AI model until and unless the ML model's accuracy satisfies a predetermined accuracy threshold (e.g., when the results predicted by the ML model are more than 85% accurate and consistent with the known results of the second fold).

In some embodiments, the ML model may be trained and fine-tuned (e.g., calibrated) using various platforms to analyze the essay. For instance, the ML model may be trained on top of a Bidirectional Encoder Representations from Transformers (BERT). The bi-directionality may allow BERT to exceed the performance of its predecessors in natural language processing. The ML model may use various NLP protocols to identify context, sentiment, and other attributes of the essay.

In some embodiments, the training dataset may include a score for each essay, such that the ML model is trained to generate a score for the essay. The score for each essay may be relative to one or more topics. For instance, the score may indicate how well the topic was discussed in the essay.

The analytics server may train the ML model using various scoring schemes. For instance, the analytics server may train the ML model, such that the ML's outputted score follows a particular scoring scheme, such as depicted in FIG. 3. In the depicted scoring scheme, the top rows indicate a numerical score for different criteria to be assessed. Each corresponding cell indicates the criteria associated with each score. When the ML model ingests the electronic document (essay), the ML model may use its training that includes the depicted scoring scheme (among other things) to generate a score.

Referring back to FIG. 2, the ML model used in the step 210 may or may not be the same ML model used in the step 204. As depicted in FIG. 1, the analytics server may achieve the same functionality using one or more models.

At step 212, the analytics server may display the identified score. When the analytics server determines that the ML model has been properly trained, the analytics server may use the trained ML model to analyze essays uploaded by the user. The ML model may ingest the uploaded essay and analyze the essay using its training. If the results are numerical (e.g., a score for the essay), the analytics server may display the score.

Additionally or alternatively, the analytics server may visually indicate a portion of the essay that can be improved (e.g., a portion of the essay that has caused the essay to receive a low score). For instance, the analytics server may highlight the relevant portion, such that the user can easily identify the areas (e.g., sentences or paragraphs) that are directed towards the identified score (e.g., cliché). Additionally, the analytics server may also display one or more suggestions regarding how to improve the uploaded essay. For instance, the analytics server may help eliminate clichés, provide/suggest alternative wording, provide structural improvements, redundancy analysis, and the like. For instance, the topic of "my pandemic experience" may be very popular and considered less impactful to college admissions. As a result, the analytics server may recommend considering another topic area.

The analytics server may continuously/periodically train and improve the ML model using user interactions and feedback. The analytics server may monitor various users' interactions with the displayed results to improve the ML model by revising and retraining the ML model. The analytics server may monitor the user device viewing results to identify interactions between the user and the user device while the user device is outputting the results. Based on the user's interactions (e.g., approval, denial, and/or modification of the essay), the analytics server may then revise and retrain the ML model.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A computer-implemented method comprising:
receiving, by a computer, at least one input corresponding to at least one of an attribute of a user or an interest of the user;
generating, by the computer, one or more data structures from one or more combinations of attributes of the user or interests of the user;
tokenizing, by the computer, the one or more data structures, wherein tokenizing includes attaching metadata tags that adjusts a respective significance of a respective positional encoding for the one or more data structures based on the one or more combinations of attributes of the user or interests of the user to emphasize one or more attributes or interests during execution of a machine-learning model;
executing, by the computer, the machine-learning model to generate at least one topic associated with an essay based on the respective significance of the respective positional encoding for the one or more data structures, wherein the machine-learning model is trained using a training dataset comprising a corpus of electronic documents and corresponding user attributes;
in response to outputting, by the computer, the at least one topic, receiving, by the computer, an electronic document associated with the at least one topic;
executing, by the computer, the machine-learning model to identify a score corresponding to the at least one topic and associated with the electronic document using the at least one topic;
displaying, by the computer, the score;
in response to identifying, by the computer, the score, visually highlighting, by the computer, a portion of the electronic document corresponding to the score that caused the score to be lower than a threshold; and

displaying, by the computer, an alternative content to replace the visually highlighted portion, the alternative content corresponding to an increased score for the electronic document.

2. The computer-implemented method of claim 1, wherein the attribute includes at least one of an academic strength, an extracurricular activity, or course experience.

3. The computer-implemented method of claim 1, wherein executing, by the computer, the machine-learning model to identify the score comprises executing a natural language processing protocol to identify context of at least a portion of the electronic document.

4. The computer-implemented method of claim 1, wherein the machine-learning model predicts an interest or skill for the user.

5. The computer-implemented method of claim 1, further comprising:
filtering or ranking the at least one topic in accordance with a criterion.

6. The computer-implemented method of claim 1, wherein the score indicates whether the electronic document includes a cliché.

7. A system comprising:
a machine-learning model; and
a processor in communication with the machine-learning model, the processor configured to:
receive at least one input corresponding to at least one of an attribute of a user or an interest of the user;
generate one or more data structures from one or more combinations of attributes of the user or interests of the user;
tokenize the one or more data structures, wherein tokenizing includes attaching metadata tags that adjusts a respective significance of a respective positional encoding for the one or more data structures based on the one or more combinations of attributes of the user or interests of the user to emphasize one or more attributes or interests during execution of a machine-learning model;
execute the machine-learning model to generate at least one topic associated with an essay based on the respective significance of the respective positional encoding for the one or more tokenized data structures, wherein the machine-learning model is trained using a training dataset comprising a corpus of electronic documents and corresponding user attributes;
in response to outputting the at least one topic, receive an electronic document associated with the at least one topic;
execute the machine-learning model to identify a score corresponding to the at least one topic and associated with the electronic document using the at least one topic;
display the score;
in response to identifying the score, visually highlight a portion of the electronic document corresponding to the score that caused the score to be lower than a threshold; and
display an alternative content to replace the visually highlighted portion, the alternative content corresponding to an increased score for the electronic document.

8. The system of claim 7, wherein the attribute includes at least one of an academic strength, an extracurricular activity, or course experience.

9. The system of claim 7, wherein executing the machine-learning model to identify the score comprises executing a natural language processing protocol to identify context of at least a portion of the electronic document.

10. The system of claim 7, wherein the machine-learning model predicts an interest or skill for the user.

11. The system of claim 7, wherein the processor is further configured to:

filter or rank the at least one topic in accordance with a criterion.

12. The system of claim 7, wherein the score indicates whether the electronic document includes a cliché.

13. A system comprising:

a processor; and a machine-readable computer medium having a set of instructions that when executed cause the processor to:

receive at least one input corresponding to at least one of an attribute of a user or an interest of the user;

generate one or more data structures from one or more combinations of attributes of the user or interests of the user;

tokenize the one or more data structures, wherein tokenizing includes attaching metadata tags that adjusts a respective significance of a respective positional encoding for the one or more data structures based on the one or more combinations of attributes of the user or interests of the user to emphasize one or more attributes or interests during execution of a machine-learning model;

execute the machine-learning model to generate at least one topic associated with an essay based on the respective significance of the respective positional encoding for the one or more tokenized data structures, wherein the machine-learning model is trained using a training dataset comprising a corpus of electronic documents and corresponding user attributes;

in response to outputting the at least one topic, receive an electronic document;

execute the machine-learning model to identify a score corresponding to the at least one topic and associated with the electronic document using the at least one topic;

display the score;

in response to identifying the score, visually highlight a portion of the electronic document corresponding to the score that caused the score to be lower than a threshold; and display an alternative content to replace the visually highlighted portion, the alternative content corresponding to an increased score for the electronic document.

14. The system of claim 13, wherein the attribute includes at least one of an academic strength, an extracurricular activity, or course experience.

15. The system of claim 13, wherein executing the machine-learning model to identify the score comprises executing a natural language processing protocol to identify context of at least a portion of the electronic document.

16. The system of claim 13, wherein the machine-learning model predicts an interest or skill for the user.

\* \* \* \* \*